Oct. 26, 1926.
H. O. HEM
VIBRATION PREVENTING MEANS
Filed Oct. 24, 1924
1,604,446
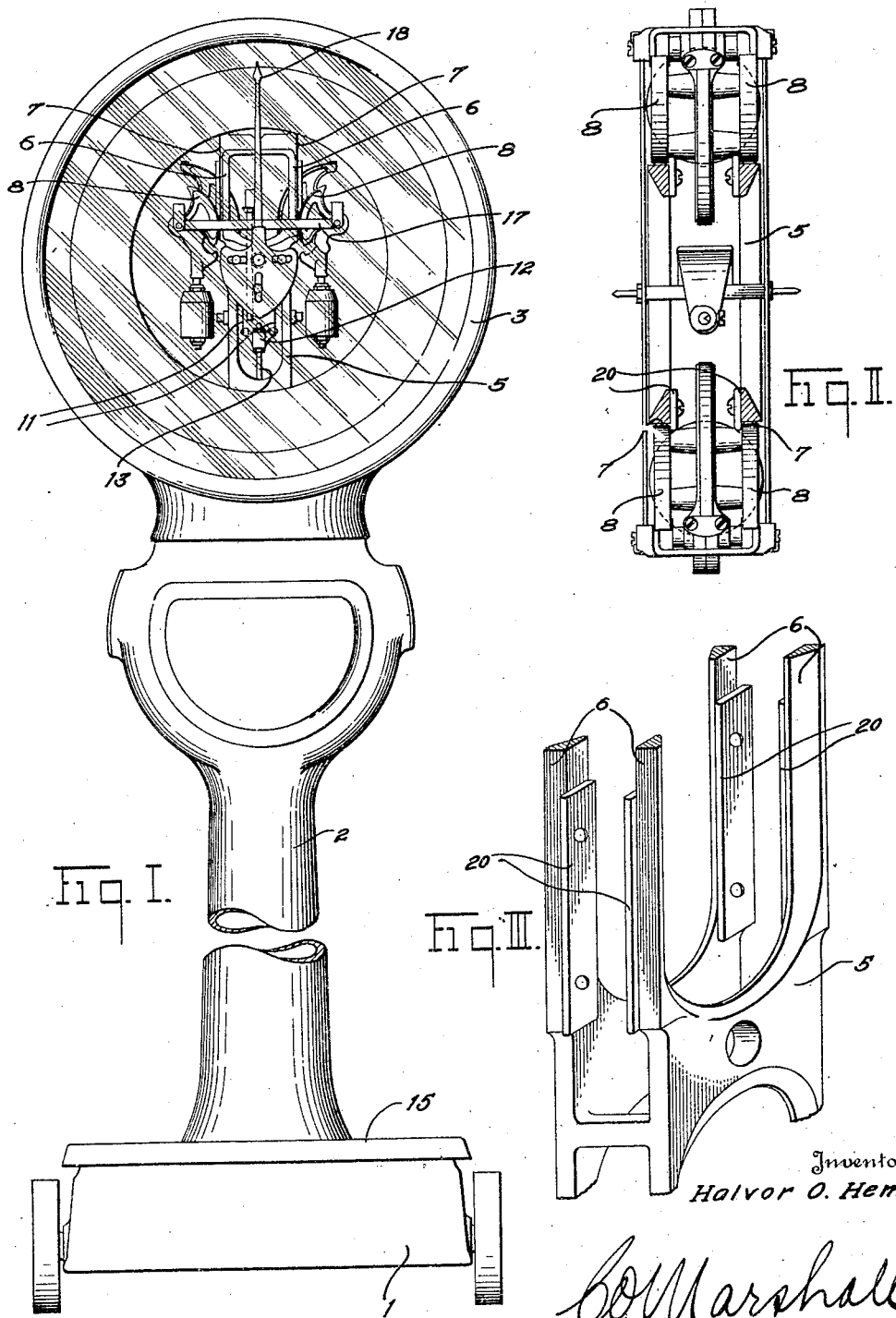
Inventor
Halvor O. Hem
C. O. Marshall
Attorney Patented Oct. 26, 1926.

1,604,446

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

VIBRATION-PREVENTING MEANS.

Application filed October 24, 1924. Serial No. 745,591.

This invention relates to weighing scales, and more particularly to improved means for preventing injury to the indicating means from vibration and shocks.

When a scale is placed in a building having unstable floors or in any place where the scale is subjected to excessive vibrations, the indicating mechanism cannot assume a position of rest as long as the scale is being vibrated by some exterior force. This is particularly true if continued vibration of the scale support causes fore and aft oscillation of the pendulums which prevent the indicating hand from coming to rest.

One of the principal objects of this invention is the provision of means for preventing fore and aft oscillation of the pendulums.

Another object is the provision of means for preventing displacement of the pendulums if the scale is suddenly moved or tipped from its normal upright position.

Another object is to prevent kinking of the pendulum supporting ribbons.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale of the so-called portable type having a double floating pendulum load-offsetting mechanism.

Figure II is an enlarged top plan view of the pendulum load-offsetting mechanism, the pendulum supporting member being shown in section; and Figure III is a fragmentary perspective view of the pendulum supporting structure.

Referring to the drawings in detail, I have shown my invention as applied to a scale of the portable type, which is the type usually found in factories or other places in which moving machinery causes a vibration of the floors. It is to be understood that this invention is applicable to all types of pendulum scales, such, for example, as hanging scales, which are continuously in oscillation, track scales for weighing cars while in motion, or in almost any pendulum scale which is subjected to vibrations which would result in vibration of the indicator hand. The scale shown in the drawings consists of a base 1 supporting and housing platform levers (not shown), a column 2 supported at the rear end of the base, a watch-case-shaped head 3 surmounting the column 2 and adapted to house and support the automatic load-offsetting mechanism. This load-offsetting mechanism is of the double pendulum type, and is supported upon a rigid frame 5 having substantially vertical side members or posts 6 with flexible metallic pendulum supporting ribbons 7 secured at their upper ends and overlying their opposed faces. The lower ends of the ribbons 7 are secured to the fulcrum sectors 8 of the pendulums, and positioned between the respective pairs of fulcrum sectors 8 are the power sectors 9 which are connected by means of flexible ribbons 11 to an equalizer yoke or bar 12 fixed upon the upper extremity of the steelyard rod 13. The steelyard rod 13 is connected to the platform lever mechanism, and when a load is placed upon the platform 15 a downward pull is exerted upon the steelyard rod and the ribbons 11, causing the pendulums to move outwardly and upwardly to offset such load. A compensating or equalizing bar 17 connecting the pendulums together is also connected by means of a rack and pinion mechanism (not shown) to the indicator hand 18, which is adapted to move over a suitably graduated chart to indicate the weight of the load upon the scale platform.

If the scale is placed upon an unstable support in a place which is subject to vibration from, for example, moving machinery, the vibration may be communicated to the scale, especially if its frequency corresponds to the natural period of the pendulum mechanism. If the vibration acts in a plane parallel with the plane of oscillation of the pendulums, it may have a tendency to prevent the pendulums from coming to rest in positions of equilibrium, but such tendency to vibrate is dampened by the usual dash pot which is incorporated in all weighing scales. If, however, the vibration acts in a plane at right angles to the plane of oscillation of the pendulums, a fore and aft movement is imparted to the pendulums which causes vibration of the indicator hand and which is not dampened by means of the dash pot. To prevent such fore and aft movement of the pendulums I have provided tracks or guide rails 20 fixed to the opposed faces of the posts 6 of the pendulum supporting frame 5, which serve to guide the fulcrum sectors during weighing movements and prevent any appreciable lateral movement of the pendulums. Enough clearance is provided between the guide rails and the sectors to permit free movement of said sectors, so that no friction is set up during the weighing movements.

It is obvious from the foregoing description that such a device will not only decrease the tendency of the pendulum to vibrate in a fore and aft direction, but will prevent actual displacement of the pendulums if the scale should be moved or tipped from its normal position.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a supporting frame, a pendulum, a flexible member connected to said supporting frame and said pendulum, and means including a guide on said supporting frame for preventing fore and aft movement of said pendulum.

2. In a device of the class described, in combination, a supporting frame having a substantially vertical surface, a flexible member secured to said supporting frame and overlying said vertical surface, a load-counterbalancing pendulum supported by said flexible member, said pendulum having a sector adapted to roll upon said flexible member, and means including a flange secured to said frame for preventing fore and aft movement of said pendulum.

3. In a device of the class described, in combination, a supporting frame having a substantially vertical surface, a flexible member secured to said supporting frame and overlying said vertical surface, a load-counterbalancing pendulum supported by said flexible member, said pendulum having a sector adapted to roll upon said flexible member, and means including a flange secured to said frame for preventing fore and aft movement of said pendulum, said flange being normally out of engagement with said pendulum.

4. In a device of the class described, in combination, a supporting frame, said supporting frame having a substantially vertical surface, a flexible metallic ribbon overlying said surface, a pendulum supported by said flexible metallic ribbon, said pendulum having a sector adapted to roll upon said ribbon, and means comprising a flange extending along said ribbon and normally out of contact with said ribbon and said pendulum and adapted to be engaged by said pendulum to prevent undue fore and aft movement thereof.

5. In a device of the class described, in combination, a supporting frame, said supporting frame having a pair of substantially vertical surfaces, flexible metallic ribbons secured to said supporting frame and overlying said surfaces, load-counterbalancing pendulums supported by said ribbons, said pendulums having curved sectors adapted to roll upon said ribbons during weighing movements, and flanges lying along said ribbons for preventing swinging movement of said pendulums, said flanges being normally out of engagement with said ribbons and said pendulums.

HALVOR O. HEM.